United States Patent
Lima et al.

(10) Patent No.: US 8,953,922 B1
(45) Date of Patent: Feb. 10, 2015

(54) FIBER RIBBON STRAIN RELIEF CLAMP

(75) Inventors: David J. Lima, Gilroy, CA (US); John I. Kull, Redwood City, CA (US)

(73) Assignee: Juniper Networks, Inc., Sunnyvale, CA (US)

(*) Notice: Subject to any disclaimer, the term of this patent is extended or adjusted under 35 U.S.C. 154(b) by 697 days.

(21) Appl. No.: 13/190,687

(22) Filed: Jul. 26, 2011

(51) Int. Cl.
| | |
|---|---|
| *G02B 6/00* | (2006.01) |
| *G02B 6/44* | (2006.01) |
| G02B 6/38 | (2006.01) |
| G02B 6/42 | (2006.01) |

(52) U.S. Cl.
CPC ............... *G02B 6/44* (2013.01); *G02B 6/4471* (2013.01); *G02B 6/3825* (2013.01); *G02B 6/4477* (2013.01); *G02B 6/3887* (2013.01); *G02B 6/3897* (2013.01); *G02B 6/4248* (2013.01)
USPC .................................. 385/136; 385/137

(58) Field of Classification Search
USPC .................................................. 385/136–137
See application file for complete search history.

(56) References Cited

U.S. PATENT DOCUMENTS

| | | | | |
|---|---|---|---|---|
| 5,245,683 | A * | 9/1993 | Belenkiy et al. ................. | 385/72 |
| 6,078,718 | A | 6/2000 | Merriken et al. | |
| 6,427,936 | B1 * | 8/2002 | Noel et al. ..................... | 242/399 |
| 6,682,230 | B1 * | 1/2004 | Demangone et al. ........... | 385/88 |
| 6,712,527 | B1 * | 3/2004 | Chan et al. ....................... | 385/88 |
| 6,729,773 | B1 | 5/2004 | Finona et al. | |
| 6,857,790 | B2 | 2/2005 | Fontecha et al. | |
| 6,985,665 | B2 * | 1/2006 | Baechtle ......................... | 385/136 |
| 7,636,507 | B2 * | 12/2009 | Lu et al. ......................... | 385/135 |
| 7,802,926 | B2 * | 9/2010 | Leeman et al. .................. | 385/86 |
| 2008/0044141 | A1 * | 2/2008 | Willis et al. ..................... | 385/88 |
| 2008/0240658 | A1 * | 10/2008 | Leeman et al. .................. | 385/81 |
| 2010/0329607 | A1 * | 12/2010 | Drost et al. ...................... | 385/37 |
| 2011/0002591 | A1 * | 1/2011 | Lu et al. ......................... | 385/135 |

OTHER PUBLICATIONS

OFNS—Optical Fiber Network Saddle, Fiber Optic Cable Management Products: optical fiber, fiber optic equipment, Richco, Inc., Retrieved from the Internet May 5, 2011.
TPCE—OFBLT Holding Clip, Standoff, Fiber Optic Cable Management Products: optical fiber, fiber optic equipment, Retrieved from the Internet May 5, 2011.
OFBLT-C1—OFBLT Holding Clip Fiber Optic Cable Management Products: optical fiber, fiber optic equipment—, Richco, Inc., Retrieved from the Internet May 5, 2011.
HMCC—Cable Clamp, Hinged, Screw Mnt, Cable Management and Wire Management Products, Cable Clamps, Richo, Inc., Retrieved from the Internet May 5, 2011.

* cited by examiner

*Primary Examiner* — Ryan Lepisto
*Assistant Examiner* — Guy Anderson
(74) *Attorney, Agent, or Firm* — Cooley LLP

(57) ABSTRACT

An apparatus for clamping and relieving strain in a set of optical fiber ribbon. The strain relief clamp includes a first attachment portion and second attachment portion configured to secure the strain relief clamp to a system component and a set of optical fiber ribbons to the strain relief clamp. When secured the strain relief clamp is configured to relieve strain in the set of optical fiber ribbons.

19 Claims, 10 Drawing Sheets

FIBER RIBBON STRAIN RELIEF CLAMP

BACKGROUND

The embodiments described herein relate generally to a clamp. More particularly, some embodiments described herein relate to an optical fiber ribbon strain relief clamp.

The use of optical fibers in electronic, communication, and network applications in recent years has become ever more prevalent due to its higher bandwidth, immunity to electromagnetic interference, and low loss characteristics over long distances. In use, the optical fiber typically connects at each end to transceivers that send and receive an optical signal as well as convert the optical signal to an electrical signal.

Optical fibers can be configured into a ribbon formation combining many individual optical fibers, often in multiples of 12 (e.g. 1×12 fiber configuration, up to 6×12), into a single bundled ribbon. Optical fiber ribbon when used in multi-channel optical interconnects is typically somewhat flexible but also delicate. If the ribbon is bent or twisted beyond its limits, the optical performance can be compromised and, in a worst-case scenario, one or more of the fibers in the ribbon can break resulting in a catastrophic failure. In certain systems, multiple optical transceivers, such as VCSELs (vertical-cavity surface emitting lasers), are often arrayed on a circuit board in patterns constrained by interconnect and signal integrity rules that result in tortuous paths for the optical fiber ribbons to negotiate. The optical ribbon should be guided to their terminus without kinks or tight bends to avoid any of the failures mentioned above. Therefore, strain relief and managing the routing of the optical ribbon is desirable but due to the tight spaces found on many circuit boards this can be a challenge.

Thus, a need exists for an improved system for clamping and relieving strain in a fiber ribbon.

SUMMARY

Systems and methods for the strain relieving and clamping of optical fiber ribbon are described herein. In some embodiments, an apparatus includes a first attachment portion and a second attachment portion that are monolithically formed. The first attachment portion includes a first surface and a second surface configured to create a first configuration, substantially open, and a second configuration, substantially closed or clamped. The first surface and the second surface are moveably coupled with a live hinge or a tether. The first surface includes a first and second protrusion each with a longitudinal centerline orthogonal to the longitudinal centerline of the optical fiber ribbon. The second surface includes a protrusion with a longitudinal centerline orthogonal to the longitudinal centerline of the optical fiber ribbon. The optical ribbon is adjustably clamped between the first and second protrusion of the first surface and the protrusion of the second surface. The second attachment portion of the strain relief clamp is configured to couple to a component included in the system of which the apparatus is apart, such as a circuit board, electrical component, an active optical component, and/or the like.

DETAILED DESCRIPTION

Figure 1:
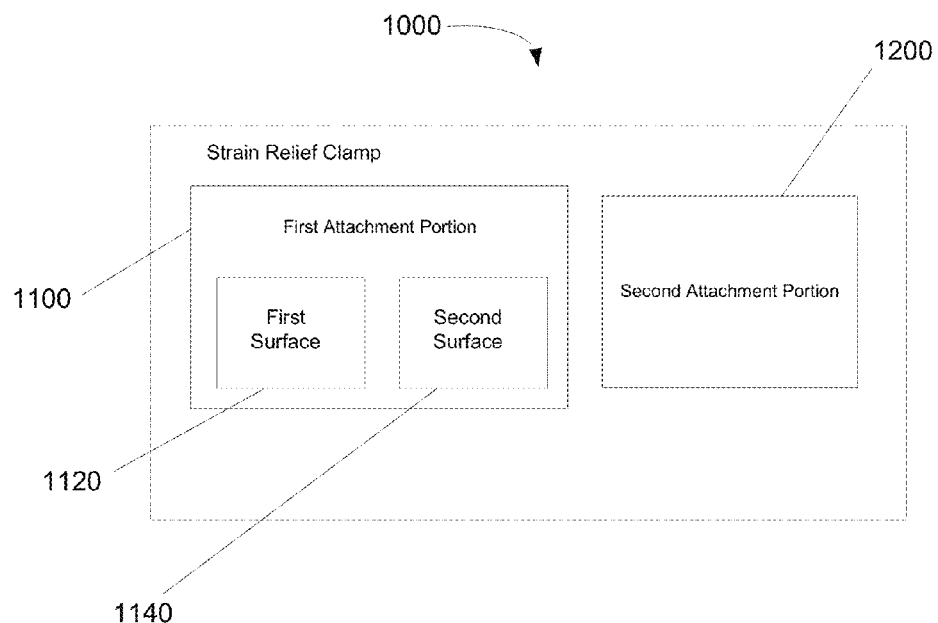
FIG. 1 is a system block diagram of a strain relief clamp according to an embodiment.

Systems and methods for strain relieving and clamping optical fiber ribbon are described herein. In some embodiments, a strain relief clamp includes a first attachment portion and a second attachment portion that are monolithically formed. The first attachment portion includes a first surface, a second surface, and a live hinge between the first surface and second surface. The live hinge is arranged such as to define a first configuration, substantially open, and a second configuration, substantially closed or clamped. The first surface includes a first protrusion and a second protrusion each with a longitudinal centerline substantially orthogonal to the longitudinal centerline of the optical fiber ribbon. The second surface includes a protrusion with a longitudinal centerline substantially orthogonal to the longitudinal centerline of the optical fiber ribbon. Similarly stated, the three protrusions are substantially parallel to each other and each is substantially perpendicular to at least a portion of the length of the optical ribbon in the strain relief clamp when in use (i.e., in the second configuration). The optical ribbon is adjustably clamped between the first and second protrusion of the first surface and the protrusion of the second surface with all six degrees of freedom constrained (x, y, z, pitch, yaw, and roll). The second attachment portion of the strain relief clamp includes a protrusion(s) that is configured to fit an attachment portion of an active optical component. The attachment portion of the active optical component is configured to couple to a device other than the strain relief clamp (e.g. a heat sink).

In some embodiments, the strain relief clamp includes an attachment portion configured to couple the strain relief clamp to an optical fiber ribbon. The attachment portion includes a first surface and a second surface configured to define a first configuration, substantially open, and a second configuration, substantially closed. The first surface and second surface are coupled by a tether. The first surface includes a first protrusion and a second protrusion each with a longitudinal centerline substantially orthogonal to the longitudinal centerline of the optical fiber ribbon. The second surface includes a protrusion with a longitudinal centerline substantially orthogonal to the longitudinal centerline of the optical fiber ribbon. Similarly stated, the three protrusions are substantially parallel to each other and each is substantially perpendicular to at least a portion of the length of the optical ribbon in the strain relief clamp when in use (i.e. in the second configuration).

The first surface includes a first and second aperture. The second surface includes a first elongate portion with elastically deformable extensions and a second elongate portion with elastically deformable extensions. The first elongate portion and the second elongate portion are configured to define a friction fit within the first aperture and the second aperture, respectively. The first surface and second surface are configured to clamp the optical ribbon between the first and second protrusion of the first surface and the protrusion of the second surface. As such, the first surface and second surface define a clamping space between them capable of clamping one, two, or three optical fiber ribbon(s). The first surface and second surface, excluding the respective protrusions of each, define a surface having a radius of curvature no less than the minimum bend radius of the optical fiber ribbon.

In some embodiments, a strain relief clamp includes a first attachment portion and a second attachment portion configured to couple the strain relief clamp to two sets of optical fiber ribbons. The second attachment portion is configured to be substantially similar to the first attachment portion and is adjacent to the first attachment portion. This arrangement allows for two distinct sets of optical fiber ribbons to be clamped independently. The use of the word "sets" herein refers to the option of clamping one, two, or three optical fiber ribbons between the first surface and second surface of the attachment portion. For example, the first attachment portion can be used to clamp one, two, or three optical fiber ribbon(s) defining a set of ribbons, while the second attachment portion can be used to clamp one, two, or three optical fiber ribbon(s) defining a second set of ribbons. Furthermore, the number of ribbons clamped by the first attachment portion can be equal to, or different from, the number of ribbons clamped by the second attachment portion.

The first attachment portion includes a first surface and a second surface configured to define a first configuration, substantially open, and a second configuration, substantially closed. The first surface and second surface are coupled by a tether. The first surface includes a first protrusion and a second protrusion each with a longitudinal centerline substantially orthogonal to the longitudinal centerline of one of the optical fiber ribbons. The second surface includes a protrusion with a longitudinal centerline substantially orthogonal to the longitudinal centerline of one of the optical fiber ribbons. Similarly stated, the three protrusions are substantially parallel to each other and each is substantially perpendicular to at least a portion of the length of the optical fiber ribbon when in use (i.e., in the second configuration). The first surface includes a first and second aperture. The second surface includes a first elongate portion with elastically deformable extensions and a second elongate portion with elastically deformable extensions. The first elongate portion and the second elongate portion are configured to define a friction fit within the first aperture and the second aperture, respectively. The first surface and second surface are configured to clamp an optical ribbon between the first and second protrusion of the first surface and the protrusion second surface and as such, define a clamping space between the first surface and the second surface capable of clamping one, two, or three optical fiber ribbon(s). The first surface and second surface, excluding the respective protrusions of each, define a surface having a radius of curvature no less than the minimum bend radius of the optical fiber ribbon.

FIG. 1 is a system block diagram of a strain relief clamp 1000 configured to relieve strain in an optical fiber ribbon according to an embodiment. The apparatus 1000 includes a first attachment portion 1100 and a second attachment portion 1200, which are monolithically formed together. The first attachment portion 1100 includes a first surface 1120 and a second surface 1140 collectively configured to define a first configuration, substantially open, and a second configuration, substantially closed or clamped. In some embodiments, the first surface 1120 and the second surface 1140 are formed monolithically. The first surface 1120 and the second surface 1140 can be of similar size, shape, and thickness and can be of constant width. In some embodiments, the first surface 1120 can be of a first size and the second surface 1140 can be of a second size, substantially different from the first. The first surface 1120 and the second surface 1140 can be coupled, for example, by a tether (i.e., a thin lead of the same or similar material with a given flexibility, configured to moveably couple the first surface 1120 and the second surface 1140).

When in the first configuration, the first attachment portion 1100 receives the optical fiber ribbon, such that the longitudinal centerline of the optical fiber ribbon is substantially orthogonal to the longitudinal centerline of both the first surface 1120 and the second surface 1140. Similarly stated the first attachment portion 1100 is configured such that the optical fiber ribbon lays across the width of the first surface 1120 when in a first configuration. This arrangement allows the second surface 1140 to be placed in a second configuration wherein the first surface 1120 and the second surface 1140 act to clamp securely and non-destructively the optical fiber ribbon. More specifically, the first surface 1120 and the second surface 1140 are in opposite but substantially parallel positions while in the second configuration and contact the optical fiber ribbon on two opposite sides. The space created between the first surface 1120 and the second surface 1140 is configured to clamp securely and non-destructively and relieve strain from one, two, or three optical fiber ribbon(s). Said differently, the first attachment portion 1100 is configured to secure up to, for example, three optical fiber ribbons between the first surface 1120 and second surface 1140 by varying the space between the surfaces. Expanding further, when securing three optical fiber ribbons the height of the three fiber ribbons stacked one on top of the other is greater than the height of one fiber ribbon and thus uses more space between the first surface 1120 and the second surface 1140. Therefore, the first attachment portion 1100 is adjustable while in the second configuration such that the first surface 1120 and the second surface 1140 can apply the substantially same pressure to a single optical fiber ribbon as to a stack of two or three optical fiber ribbons.

The second attachment portion 1200 can be configured to attach to, for example, a circuit board and/or any other suitable component. For example, the second attachment portion 1200 of the strain relief clamp 1000 can be configured to fit to an attachment portion of an active optical component (not shown in FIG. 1). The attachment portion of the active optical component is configured to couple the active optical component to a device other than the strain relief clamp (e.g. a heat sink). The second attachment portion 1200 includes a protrusion(s) configured to secure the strain relief clamp 1000 to a component included in an optical system within which the strain relief clamp 1000 is included.

Figure 2:
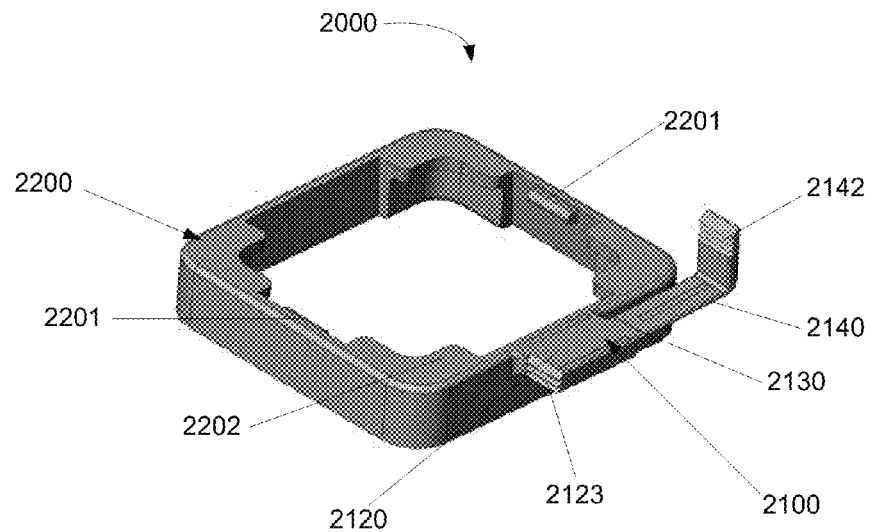
FIG. 2 is a perspective view of a strain relief clamp according to an embodiment in a first configuration.

FIG. 2 is a perspective view of a strain relief clamp 2000 according to an embodiment in a first configuration. The strain relief clamp 2000 includes a first attachment portion 2100 and a second attachment portion 2200 that are monolithically formed. The first attachment portion 2100 includes a first surface 2120 and a second surface 2140. The first attachment portion 2100 and second attachment portion 2200 are configured such that the first surface 2120 of the first attachment portion 2100 is coplanar with the top surface 2202 of the second attachment portion 2200. Said another way, the first attachment portion 2100 is a protrusion from the side of the second attachment portion 2200 with the first surface 2120 of the first attachment portion 2100 at the same level or height as the top surface 2202 of the second attachment portion 2200.

Figure 3:
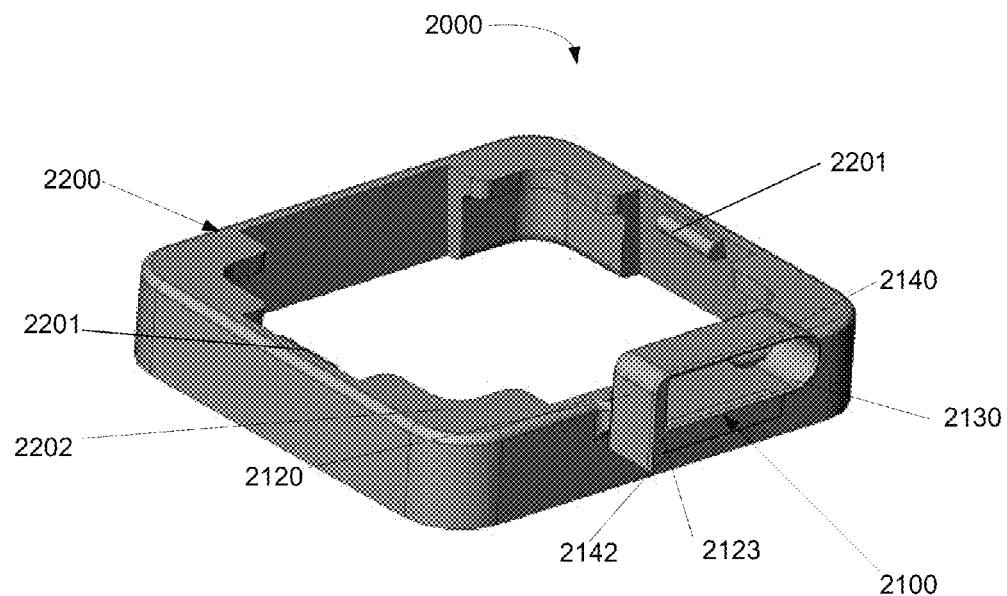
FIG. 3 is a perspective view of the strain relief clamp of FIG. 2 shown in a second configuration.

The first surface 2120 and the second surface 2140 of the first attachment portion 2100 are configured to define a first configuration, substantially open (FIG. 2), and a second configuration, substantially closed or clamped (FIG. 3). More specifically, a live hinge 2130 moveably couples the first surface 2120 to the second surface 2140. In addition, the first surface 2120 and the second surface 2140 can be of similar size, shape, and thickness and can be of constant width as shown in FIG. 2. In some embodiments, the size, shape, thickness, and/or width of the second surface 2140 can be different from that of the first surface 2120. Furthermore, the first surface 2120 and/or the second surface 2140 can tapper (i.e., narrow in width from a first point to a second point), reducing material usage.

Figure 4:
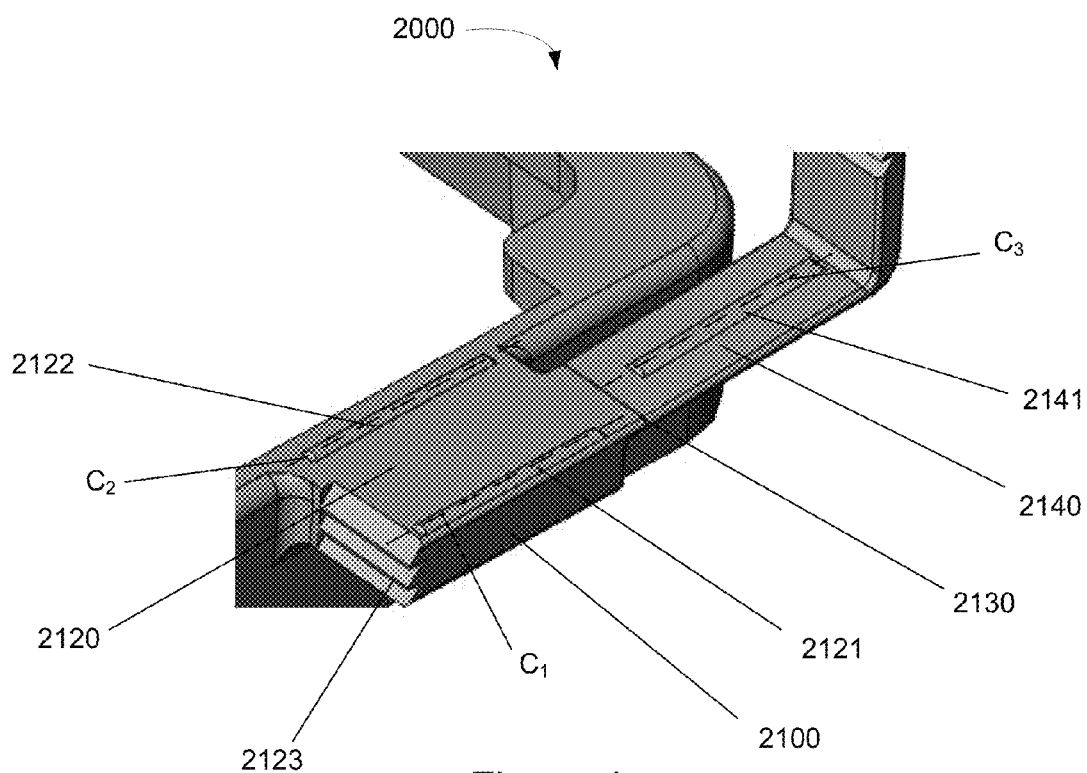
FIG. 4 is a magnified perspective view of a portion of the strain relief clamp of FIG. 2.

The first surface 2120 and the second surface 2140 are separated by the live hinge 2130. The live hinge 2130, shown magnified in FIG. 4, provides a stress concentration (i.e., a discontinuity in the material, such as an indentation along the width of the surface, configured to propagate stress from a given location) from which bending/folding of the second surface 2140 toward the first surface 2120 can occur. Although shown in FIG. 4 as an indentation, the live hinge 2130 can be of any suitable fashion that will produce a location to start and/or control the bending/folding of the second surface 2140 toward the first surface 2120. In the second configuration (FIG. 3), the first surface 2120 and the second surface 2140 are in opposite but substantially parallel positions and contact the optical fiber ribbon on two opposite sides. In the first configuration, the first surface 2120 and the second surface 2140 are coplanar or substantially flat. While moving from the first configuration to the second configuration, the second surface 2140 bends at the live hinge 2130 to a final position (i.e., the second configuration) substantially parallel to, but no longer coplanar with, the first surface 2120. While in use, the optical fiber ribbon is constrained between the first surface 2120 and the second surface 2140.

The first surface 2120 and the second surface 2140 each include a set of clamping teeth 2123 and 2142, respectively. The clamping teeth 2123 of the first surface 2120, shown magnified in FIG. 4, are configured to adjustably couple to the clamping teeth 2142 of the second surface 2140, securing the second surface 2140 in the second configuration (FIG. 3). This adjustable arrangement allows the first attachment portion 2100 to clamp, for example, one, two, or three optical fiber ribbon(s) by interlocking the set of teeth 2142 of the second surface 2140 to a desired depth on the set of teeth 2123 of the first surface 2120. Said a different way, the first attachment portion 2100 is configured to secure, for example, up to three optical fiber ribbons between the first surface 2120 and second surface 2140 by varying the space between the first surface 2120 and the second surface 2140. For example, when securing three optical fiber ribbons, the height of the three fiber ribbons stacked one on top of the other is greater than the height of a single fiber ribbon, and thus uses more space between the first surface 2120 and the second surface 2140. Therefore, the first attachment portion 2100 is adjustable while in the second configuration such that the first surface 2120 and the second surface 2140 can apply the substantially same pressure to a single optical fiber ribbon as to a stack of two or three optical fiber ribbons.

Figure 5:
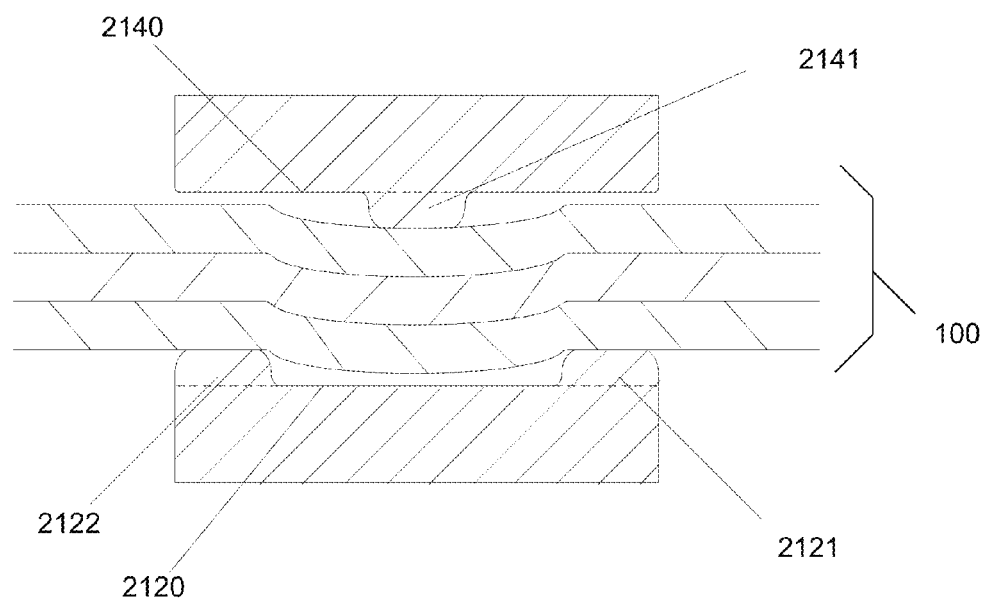
FIG. 5 is a cross-section schematic illustration of a portion of the strain relief clamp of FIG. 2 in use.

As shown in FIG. 4, the first surface 2120 includes a first protrusion 2121 and a second protrusion 2122, with the first protrusion 2121 having a first longitudinal centerline $C_1$ and the second protrusion 2122 having a second longitudinal centerline $C_2$. The second surface 2140 includes a protrusion 2141 with a third longitudinal centerline $C_3$. The three protrusions are substantially parallel to each other and each is substantially perpendicular to the length of the optical ribbon when in use (i.e., in the second configuration). The first surface 2120 and second surface 2140 are configured to clamp the optical ribbon between (1) the first protrusion 2121 and second protrusion 2122 of the first surface 2120, and (2) the protrusion 2141 of the second surface 2140. FIG. 5 shows a schematic illustration of the shape of the set of optical fiber ribbon 100 when clamped by the first protrusion 2121 and the second protrusion 2122 of the first surface 2120 and the protrusion 2141 of the second surface 2140. This clamping produces the intended strain relief, while non-destructively retaining the optical fiber ribbon 100.

While being shown as long, semi-cylindrical protrusions in FIG. 4, the protrusions can be of any suitable shape, size, and/or length. For example, the protrusions can be discontinuous (i.e., multiple protrusions sharing a similar axis). The protrusions can be less than the length of the respective surface and can be in configurations of more or less than the tree shown in FIG. 4. Furthermore, the protrusions can differ from each other, for example, the protrusion 2141 on the second surface 2140 can have a different length and/or shape than, for example, the first protrusion 2121 and/or the second protrusion 2122. Furthermore, the protrusions can be of a similar or dissimilar material to the remaining portions of the strain relief clamp 2000. For example, the first surface 2120 and the second surface 2140 can be nylon made from a first mold, and the first protrusion 2121, the second protrusion 2122, and the third protrusion 2141 can be rubber made by an over mold, thereby providing different materials at the point of clamping. In addition, the use of a dissimilar material can be applied to all or any of the protrusions on the first surface 2120 and/or the second surface 2140.

Figure 6:
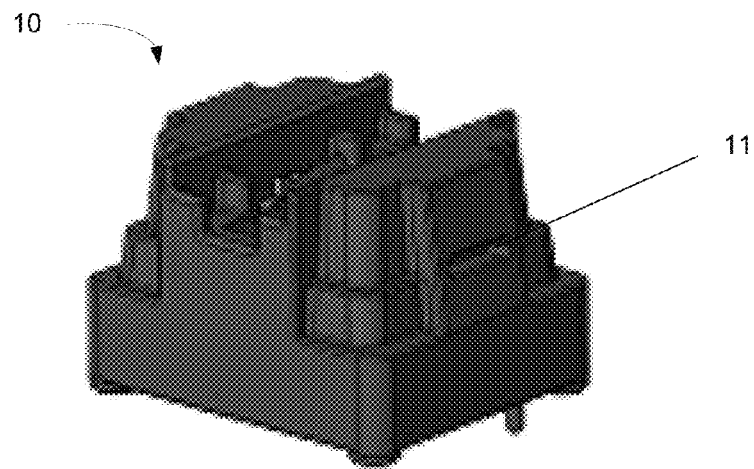
FIG. 6 is a perspective view of an active optical component.

The second attachment portion 2200 is configured to attach to a component of a given shape (for example but not limited to a VCSEL manufactured by Avago). More particularly, the second attachment portion 2200 includes a pair of protrusions 2201 (best shown in FIG. 2 and FIG. 3), configured to secure the second attachment portion 2200 to an attachment portion 11 of an active optical component 10, shown in FIG. 6. The attachment portion 11 of the active optical component 10 is configured to couple the active optical component 10 to a device other than the strain relief clamp (e.g. a heat sink). Said another way, the second attachment portion 2200 of the strain relief clamp 2000 is configured to retrofit to an existing active optical component 10, such as a VCSEL. More specifically, the pair of protrusions 2201 of the second attachment portion 2200 and the attachment portion 11 of the active optical component 10 define a press fit, whereas the second attachment portion 2200 is removeably coupled to the active optical component 10.

Figure 7:
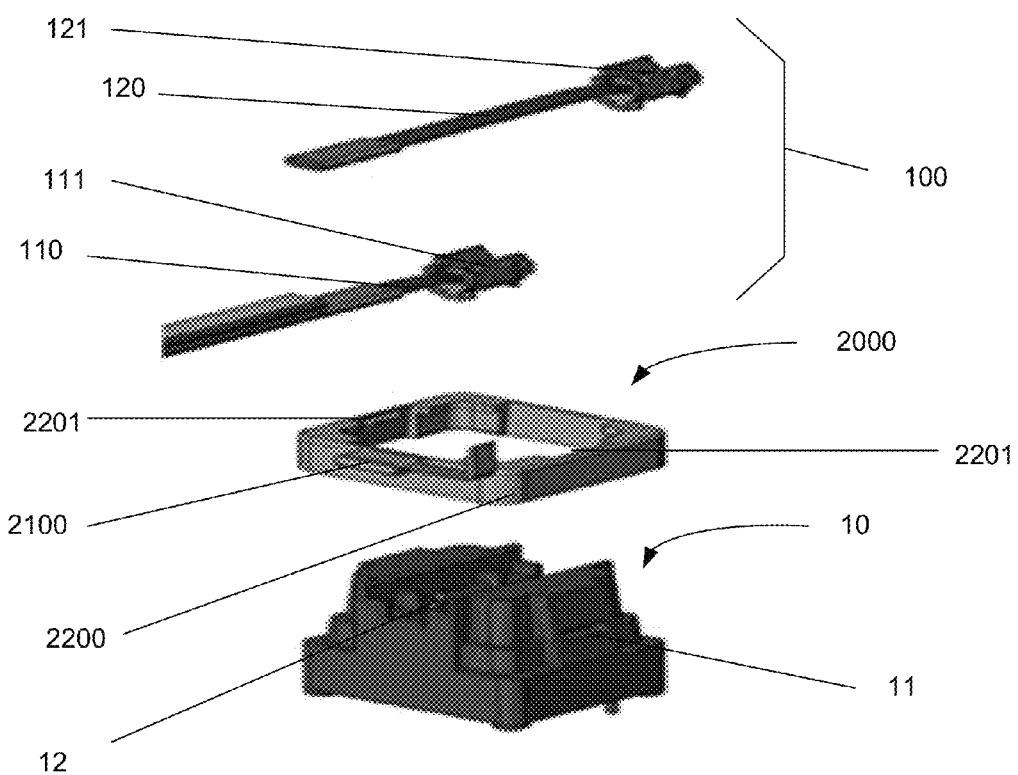
FIG. 7 is an exploded view of the strain relief clamp of FIG. 2 shown in use with the active optical component of FIG. 6.
Figure 8:
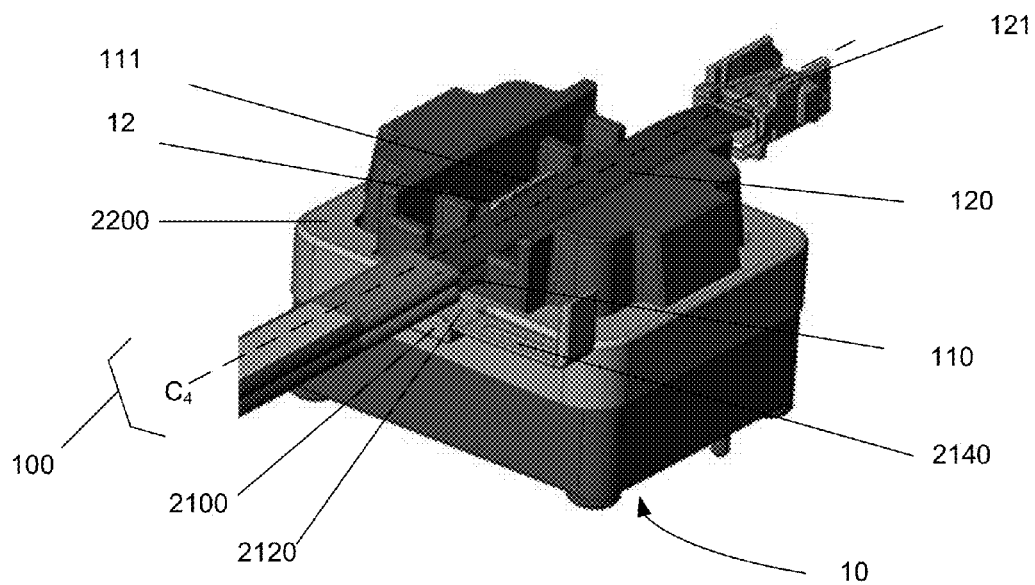
FIG. 8 is a perspective view of the strain relief clamp of FIG. 2 in a first configuration with the active optical component of FIG. 6.

FIG. 7 is an exploded view of the strain relief clamp 2000, the active optical component 10, and a set of optical fiber ribbons 100, including a first optical fiber ribbon 110 and a second optical fiber ribbon 120. The second attachment portion 2200 slides over the top of the active optical component 10 to a final position where the pair of protrusions 2201 couple to the attachment portions 11 of the active optical component 10. The height of the strain relief clamp 2000 is such that when coupled to the active optical component 10 the first optical fiber ribbon 110, having a first connector 111, is at a similar height as the receiving connector 12 of the active optical component 10, as shown in FIG. 8. More specifically, the optical fiber ribbon 110 is flat (i.e., not bent or kinked) when resting on the first surface 2120 and the first connector 111 is coupled to the receiving connector 12. The first attachment portion 2100 in the first configuration is such that the longitudinal centerline $C_4$ of the set of optical fiber ribbons 100 is substantially orthogonal to the first surface 2120 and the second surface 2140. The arrangement of the first attachment portion 2100 and the second attachment portion 2200 allows the second optical fiber ribbon 120 to be disposed on the top of the first optical ribbon 110 and extend beyond the active optical component 10 (e.g., towards the upper right side of FIG. 9). While two optical fiber ribbons are shown, some embodiment can have a singular ribbon, two ribbons, or three ribbons.

Figure 9:
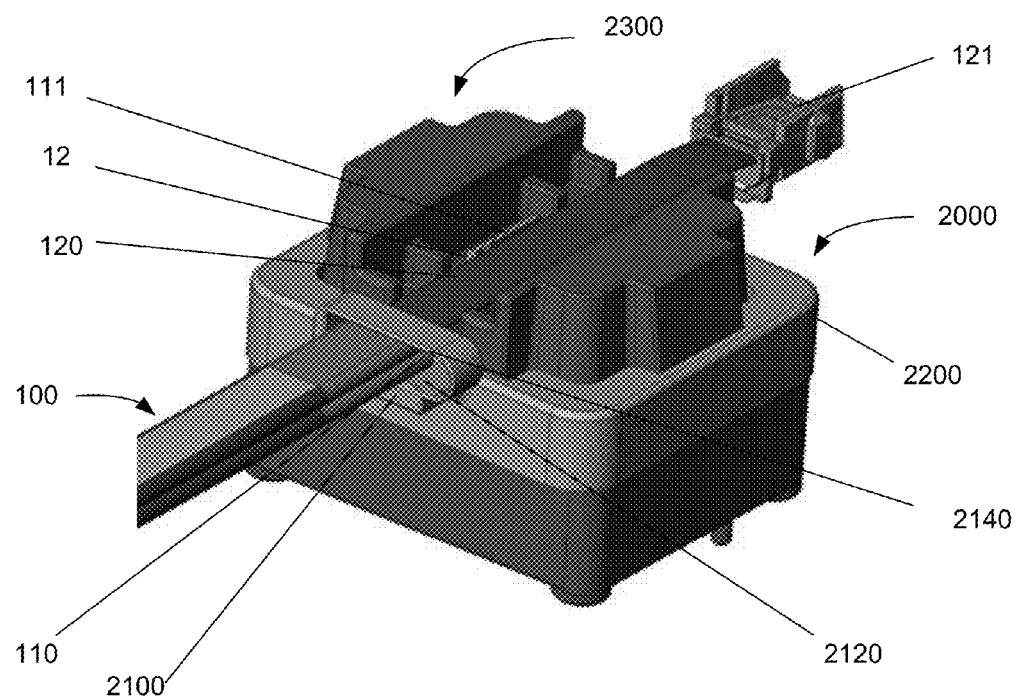
FIG. 9 is a magnified perspective view of the strain relief clamp of FIG. 2 in a second configuration with the optical component of FIG. 6.
Figure 10:
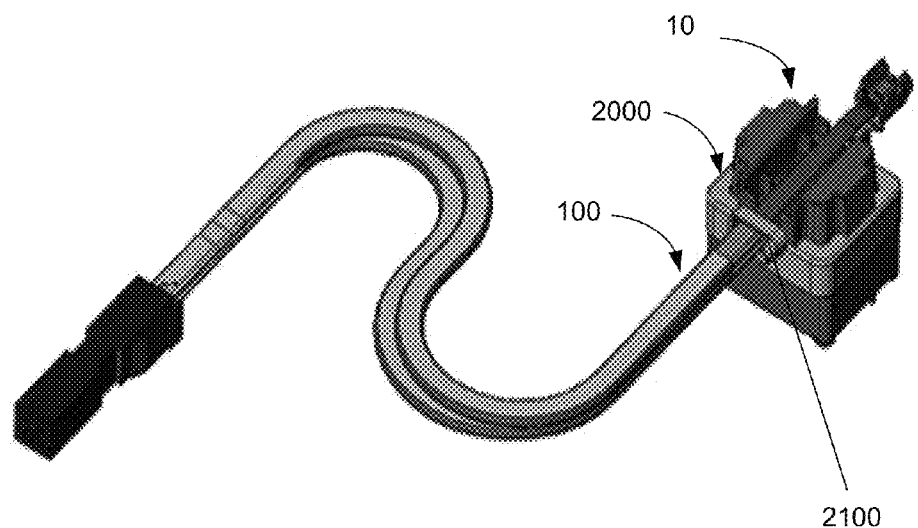
FIG. 10 is a perspective view of the strain relief clamp of FIG. 2 in a second configuration with the active optical component of FIG. 6.

FIG. 9 shows the strain relief clamp 2000, in the second configuration, coupled to the active optical component 10 according to an embodiment. The set of optical fiber ribbons 100 is secured by the first surface 2120 and the second surface 2140 of the first attachment portion 2100. More specifically, the set of fiber ribbon 100 is clamped between the first protrusion and second protrusion of the first surface and the protrusion of the second surface 2140 (the protrusions described herein are not visible in FIG. 9 but are visible in the previous FIGS. 2 and 3). The clamping of the set of optical fiber ribbons 100 allows the first connector 111 to couple to the receiving connector 12 (best shown in FIG. 7) of the active optical component 10 without bending, twisting, redirecting, or otherwise contorting the first optical fiber ribbon 110. Furthermore, the clamping of the set of fiber ribbon 100 in all six degrees of freedom (x, y, z, pitch, yawl, and roll) allows for the tortuous path the set of fiber ribbons 100 can take in a given application, as indicated in FIG. 10. Similarly stated, the clamping of the set of optical fiber ribbon 100 can control bending, twisting, rotating, and/or sliding of the set of fiber ribbons 100 and can prevent the set of fiber ribbons 2400 from exceeding its allowable maximum deflection at any given point.

Figure 11:
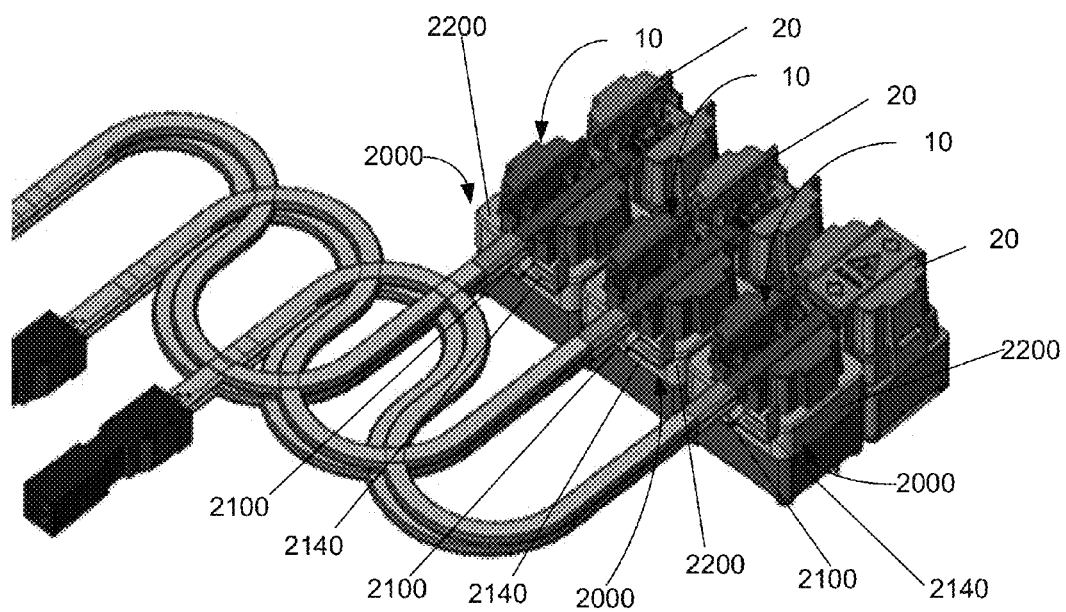
FIG. 11 is a perspective view of multiple strain relief clamps of FIG. 2 in a first configuration with multiple active optical components of FIG. 6.
Figure 12:
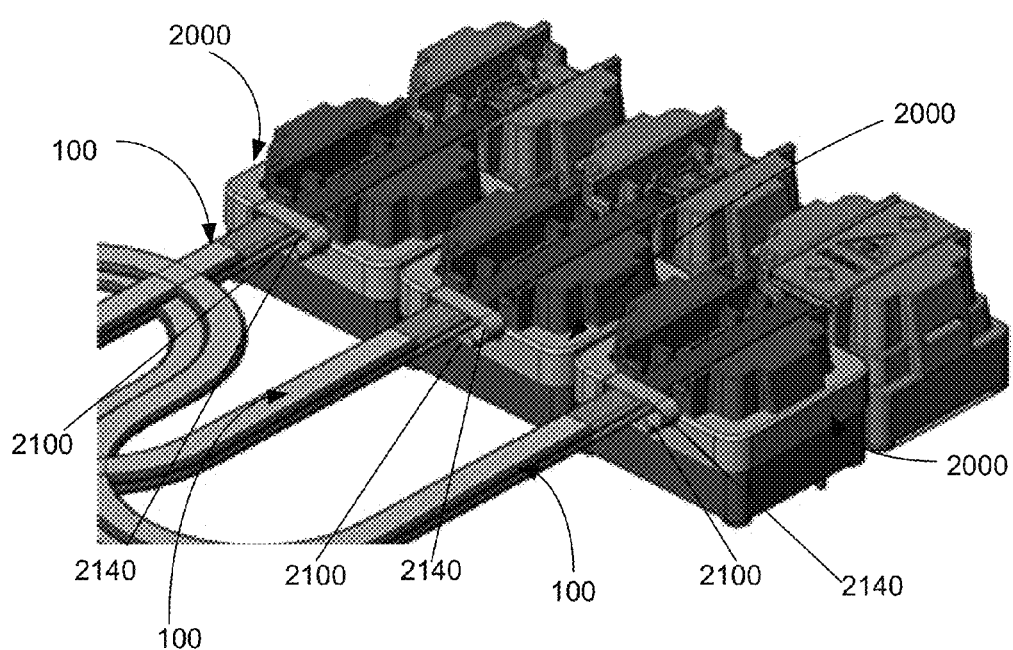
FIG. 12 is a perspective view multiple strain relief clamps of FIG. 2 in a second configuration with multiple active optical components of FIG. 6.

The strain relief clamp 2000, and more specifically the second attachment portion 2200, is configured with a relatively low profile. Consequently, multiple sets of fiber ribbon 100 can be achieved in a minimum amount of space. More particularly, the second attachment portion 2200 is of similar size as the widest portion of the active optical component 10 such that an additional strain relief clamp 2000 can be coupled to an adjacent active optical component 10, as shown in FIG. 11 and FIG. 12. Each adjacent strain relief clamp 2000 functions properly in both the first configuration (FIG. 11) and the second configuration (FIG. 12). Stated another way, while in the first configuration (FIG. 11) the second surface 2140 of the first attachment portion 2100 is not hindered, restricted, and/or otherwise inhibited by the adjacent optical component (i.e., optical fiber ribbon 100, active optical component 10, and/or another strain relief clamp 2000). Similarly, while in the second configuration (FIG. 12), the first attachment portion 2100 is not hindered, restricted, and/or otherwise inhibited by the adjacent optical component. The use of the strain relief clamp 2000 at or on a second active optical component 20, substantially behind the first active optical component 10, is not necessary due to the strain relief provided by the strain relief clamp 2000 at the first active optical component 10.

Figure 13:
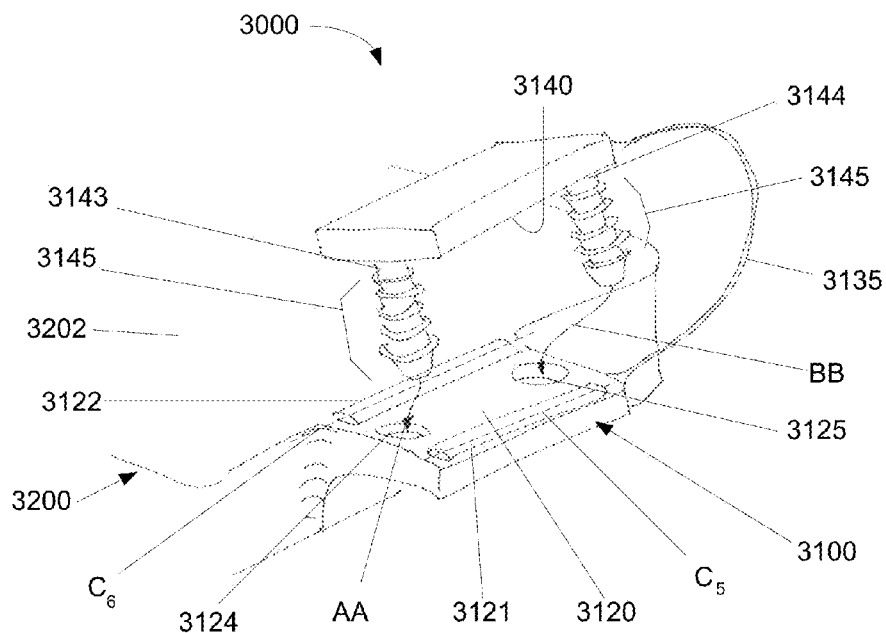
FIG. 13 is a schematic illustration of a strain relief clamp in a first configuration according to an embodiment.

FIG. 13 is a schematic illustration of a strain relief clamp 3000 with a first attachment portion 3100 and a second attachment portion 3200 in a first configuration, according to an embodiment. The second attachment portion 3200 in this embodiment is substantially similar to the second attachment portion discussed above and therefore is not shown or described in detail. The first attachment portion 3100 includes a first surface 3120 and a second surface 3140 that are monolithically formed. More specifically, the first surface 3100 and second surface 3200 are moveably coupled by a tether 3135 (i.e., a thin lead of similar material with a given flexibility). The first surface 3120 protrudes from the side of the second attachment portion 3200 such that the first surface 3120 is coplanar with a top surface 3202 of the second attachment portion 3200. In other words, the top surface 3202 and the first surface 3100 are of the same level or height.

The first surface 3120 includes a first aperture 3124 and a second aperture 3125. The second surface 3140 include a first elongate portion 3143 and a second elongate portion 3144, each with its own set of elastically deformable extensions 3145. The term elastically deformable, as used herein, refers to an objects ability to deform from a first configuration to a second configuration (i.e., bend, compress, twist, and/or otherwise contort) and return to the first configuration after the driving force of the deformation is removed. The set of extensions 3145 can be of any suitable configuration. For example, the material, size, shape, stiffness, and/or the like can be any suitable property and a given property can be the same or vary from extension to extension. For example, the set of extensions 3145 can be configured where the overall shape formed by the edges of the extensions 3145 is that of a cone. The protrusions closest to the surface 3140 extend the furthest from the elongate portion and progressively get smaller with the protrusion at the tip of the elongate protruding the least. In some embodiments, the extensions 3145 could form a substantially cylindrical shape, such that the extensions 3145 are of similar size and shape.

The first elongate 3143 and the second elongate 3144 are configured to be inserted into the first aperture 3124 and the second aperture 3125, respectively. In addition, when inserted the first attachment portion 3100 is in a second configuration. The motion of which is shown in FIG. 13 by arrows AA and BB, when in the second configuration, the second surface 3140 is substantially parallel to the first surface 3120, and the second surface 3140 faces the first surface 3120. Furthermore, a friction fit is produced when the first elongate 3143 and the second elongate 3144 are inserted into the first aperture 3124 and the second aperture 3125, respectively. The space between the first surface 3120 and the second surface 3140 is adjustable such that the further insertion of the first elongate 3143 and the second elongate 3144 into the first aperture 3124 and the second aperture 3125, respectively, results in a smaller space. Similarly stated, the second surface 3140 is brought closer to the first surface 3120 as the first elongate 3143 and the second elongate 3144 are further inserted into the first aperture 3124 and the second aperture 3125, respectively. This arrangement allows for the clamping and strain relieving of one, two, or three optical fiber ribbons, where the space for securing three fiber ribbons in greater than the space to clamp a single optical fiber ribbon.

The first surface 3120 includes a first protrusion 3121 and a second protrusion 3122, with the first protrusion 3121 having a first longitudinal centerline $C_5$ and the second protrusion 3122 having a second longitudinal centerline $C_6$. The second surface 3140 includes a protrusion with a third longitudinal centerline (not shown in FIG. 13). The three protrusions are substantially parallel to each other and each is substantially perpendicular to the optical fiber ribbon when in use (i.e. in the second configuration). The first surface 3120 and second surface 3140 are configured to clamp the optical ribbon between the first protrusion 3121 and second protrusion 3122 of the first surface 3120 and the protrusion of the second surface 3140. While being shown as long, semi-cylindrical protrusions in FIG. 13, the protrusions can be of any suitable shape, size or length and can be independently configured. For example, the protrusion on the second surface 3140 can be of a different length and shape the first protrusion 3121 and/or the second protrusion 3122. Furthermore, the protrusions can be of a similar or dissimilar material to that of the strain relief clamp 3000. For example, the first surface 3120 and the second surface 3140 can be nylon formed from a first mold, and the first protrusion 3121, the second protrusion 3122, and the third protrusion can be rubber, formed by an over mold. Thus, the material characteristics of the first attachment portion 3100 can differ at the locations of clamping. In addition, the use of a dissimilar material can be applied, for example, to all or any of the protrusions on the first surface 3120 and/or the second surface 3140.

Figure 14:
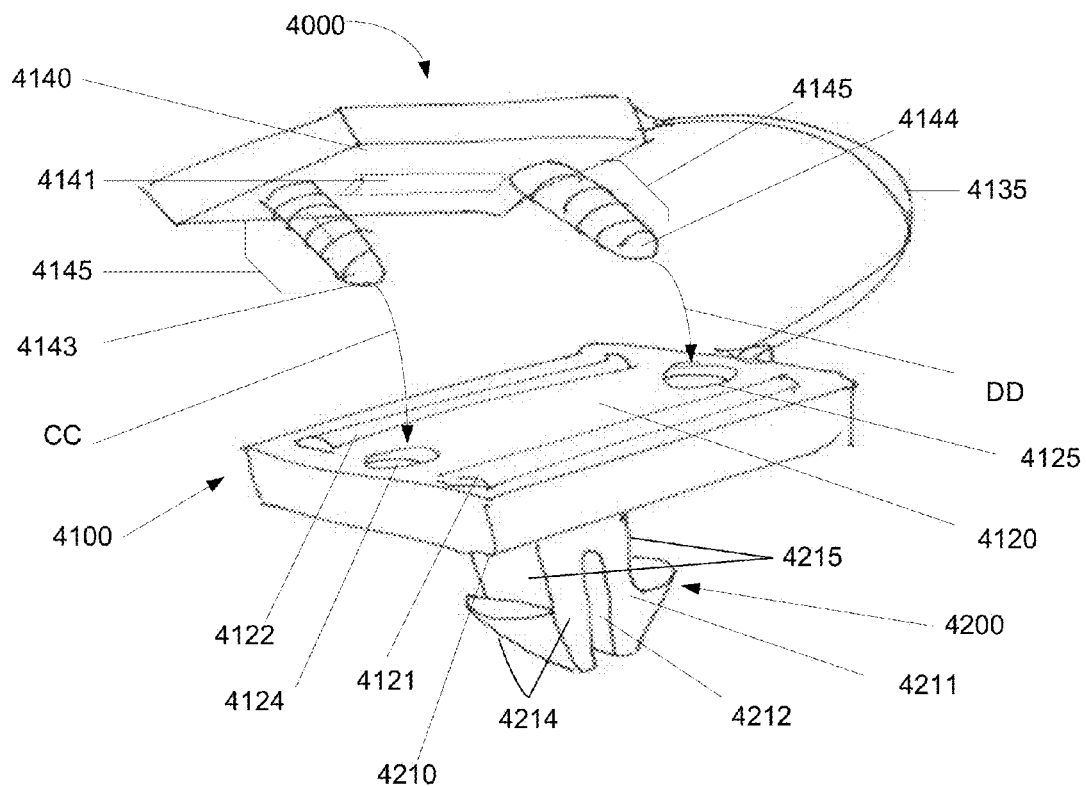
FIG. 14 is a schematic illustration of a strain relief clamp in a first configuration according to an embodiment.

FIG. 14 is a schematic illustration of a strain relief clamp 4000 according to another embodiment. The strain relief clamp 4000 includes a first attachment portion 4100 and a second attachment portion 4200 that are monolithically formed. The first attachment portion 4100 includes a first surface 4120 and a second surface 4140 that are moveably coupled by a tether 4135. The first surface 4120 and the second surface 4140 collectively have a first configuration, substantially open, and a second configuration, substantially closed or clamped. The first surface 4120 includes a first aperture 4124 and a second aperture 4125. The second surface includes a first elongate portion 4143 and a second elongate portion 4144, each having its own set of elastically deformable extensions 4145. The first aperture 4124 and the second aperture 4125 are configured to receive, at least partially, the first elongate 4143 and the second elongate 4144 as indicated by arrows CC and DD, respectively. This arrangement allows the first attachment portion 4100 to clamp and/or strain relieve a set of one, two, or three optical fiber ribbons. The first elongate 4143 and the second elongate 4144 can be inserted in the first aperture 4124 and the second aperture 4125, respectively, at various depths, thereby adjusting the space between the first surface 4120 and the second surface 4140, (e.g. the space used to secure three optical fiber ribbons is more than the space used to secure a single optical fiber ribbon). The first surface 4120 includes a first protrusion 4121 and a second protrusion 4122. The second surface 4140 includes a protrusion 4141. While in the second configuration, the first attachment portion 4100 clamps the set of optical fiber ribbons between the first protrusion 4121 and the second protrusion 4122 of the first surface 4120 and the third protrusion 4141 of the second surface 4140.

The second attachment portion 4200 shown in FIG. 14 includes a mounting portion 4210. The mounting portion 4210 is monolithically formed with the bottom surface of the first attachment portion 4100. More specifically, the mounting portion 4210 protrudes out from the first attachment portion 4100 such that the first surface 4120 is substantially orthogonal to a centerline of the mounting elongate 4120. The mounting portion 4210 has an oblong shape, where two opposite sides 4214 are substantially flat and two opposite sides 4215 are cylindrical. In some embodiments, the shape of the mounting portion 4210 can be any suitable shape, such as substantially cylindrical or rectangular. The mounting elongate 4210 includes a pair of securing tabs 4211 separated by a channel 4212. The second attachment portion 4200 is configured to couple the strain relief clamp 4000 to, for example, a circuit board, an optical component or the like. The mounting portion 4210 is configured to be inserted into an existing hole in the optical component. The channel 4212 provides a void in which the securing tabs 4211 fill as they are compressed from the insertion of the mounting portion 4210 into the receiving aperture of the optical component. Upon exiting the receiving aperture in the optical component, the securing tabs 4211 elastically expand such that mounting portion 4210 cannot be axially removed without again compressing the securing tabs 4211.

Figure 15:
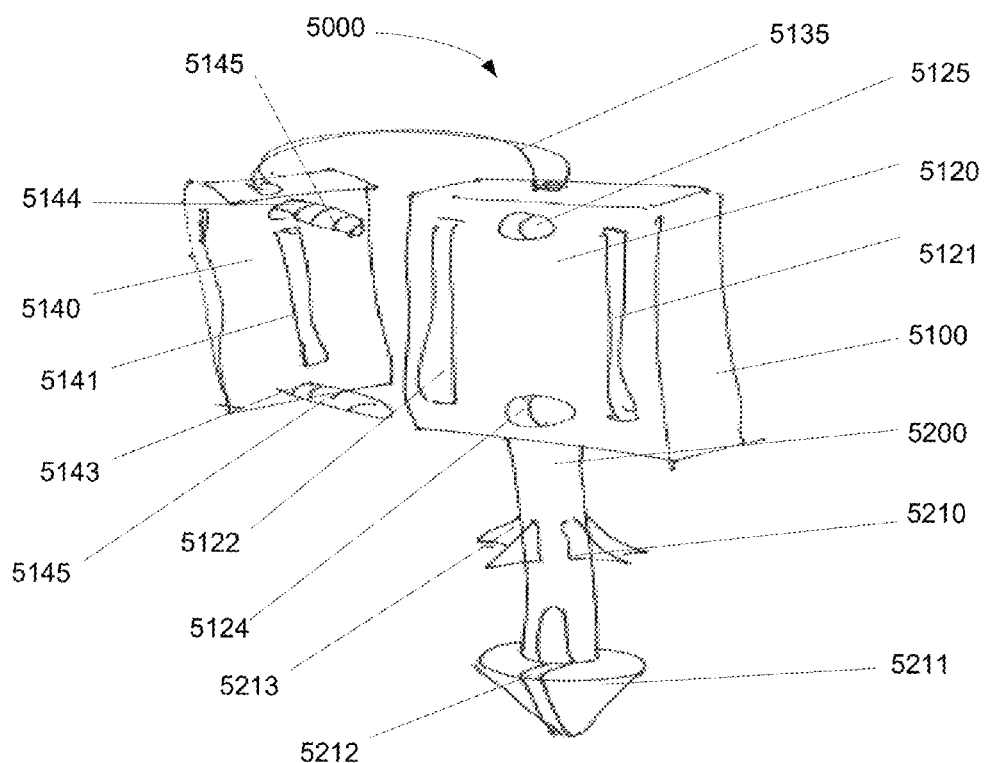
FIG. 15 is a schematic illustration of a strain relief clamp in a first configuration according to an embodiment.

FIG. 15 is a schematic illustration of a strain relief clamp 5000 according to another embodiment. The strain relief clamp 5000 includes a first attachment portion 5100 and a second attachment portion 5200. The first attachment 5100 includes a first surface 5120 and a second surface 5140 collectively configured to have a first configuration, substantially open, and a second configuration, substantially closed or clamped. The first surface 5120 includes a first protrusion 5121, a second protrusion 5122, a first aperture 5123, and a second aperture 5124. The second surface 5140 includes a protrusion 5141 and a first elongate portion 5143 and a second elongate portion 5144. The first elongate portion 5143 and the second elongate portion 5144 each include its own set of elastically deformable extensions 5145. The first aperture 5124 and the second aperture 5125 are configured to receive the first elongate 5143 and the second elongate 5144, respectively, defining a friction fit (i.e., the second configuration). When in the second configuration the first attachment portion 5100 clamps and/or strain relieves a set of one, two, or three optical fiber ribbons, between the first protrusion 5121 and the second protrusion 5122 of the first surface 5120 an the protrusion 5141 of the second surface.

The second attachment portion 5200 includes a mounting portion 5210 protruding from the side of the first attachment portion 5100. In some embodiments, the second attachment portion 5200 can extend from any surface, excluding the first surface 5120 and the second surface 5140, and can extend at any suitable angle such that when in the second configuration the optical fiber ribbon is in a desired position. The length of second attachment portion 5200 can be any suitable length for the environment. The mounting elongate 5210 shown in FIG. 15 is cylindrical in shape, though, in some embodiments, the mounting elongate 5210 can be any suitable length, size, or shape. Furthermore, the mounting elongate 5210 includes a set of securing tabs 5211, a channel 5212, and a set of height control tabs 5213. The spacing between channel 5212 and the set of height control tabs 5213 can be any spacing suitable to accommodate the thickness of optical component 5500.

Figure 16:
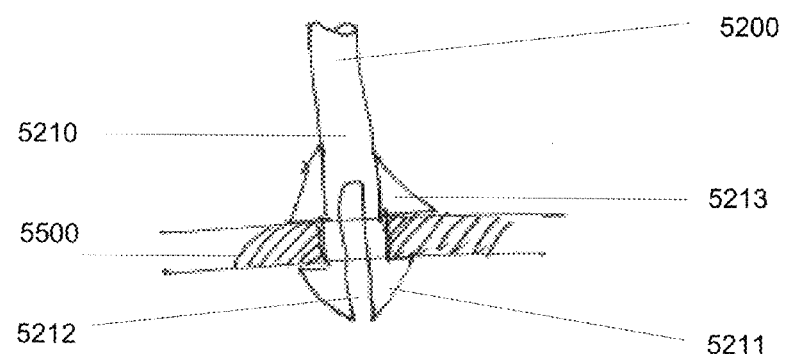
FIG. 16 is a cross-section schematic illustration of a portion of the strain relief clamp of FIG. 15.

The second attachment portion 5200 is configured to couple the strain relief clamp 5000 to an optical component. For example, the second attachment portion 5200 can couple the strain relief clamp 5000 to a circuit board or the like. The mounting elongate 5210 is configured to be inserted into a receiving aperture in the optical component. The channel 5212 provides a void in which the securing tabs 5211 fill as they are compressed from the insertion of the mounting portion 5210 into the receiving aperture of the optical component. Upon exiting the receiving aperture in the optical component 5500, the securing tabs 5211 uncompress such that the mounting portion 5210 cannot be axially removed without again compressing the securing tabs 5211. The height control tabs 5213, shown in FIG. 15, are configured to control the depth of insertion of the mounting portion 5210 into the receiving aperture in the optical component 5500. As discussed herein, the optical fiber ribbon(s) is often routed on a tortuous path and, as such, securing the fiber ribbon at different heights can be desirable. Therefore, as the mounting elongate 5210 is inserted, the height control tabs 5213 contact the optical component 5500 and prevent further insertion, as shown in FIG. 16. Though shown as fixed protrusions, in some embodiments the height control tabs 5213 can be adjustable, using setscrews and/or the like to place the height control tabs 5213 at a desired location. Moreover, the height control tabs 5213 can be any suitable size, shape, or configuration, and are not necessarily similar to each other.

Figure 17:
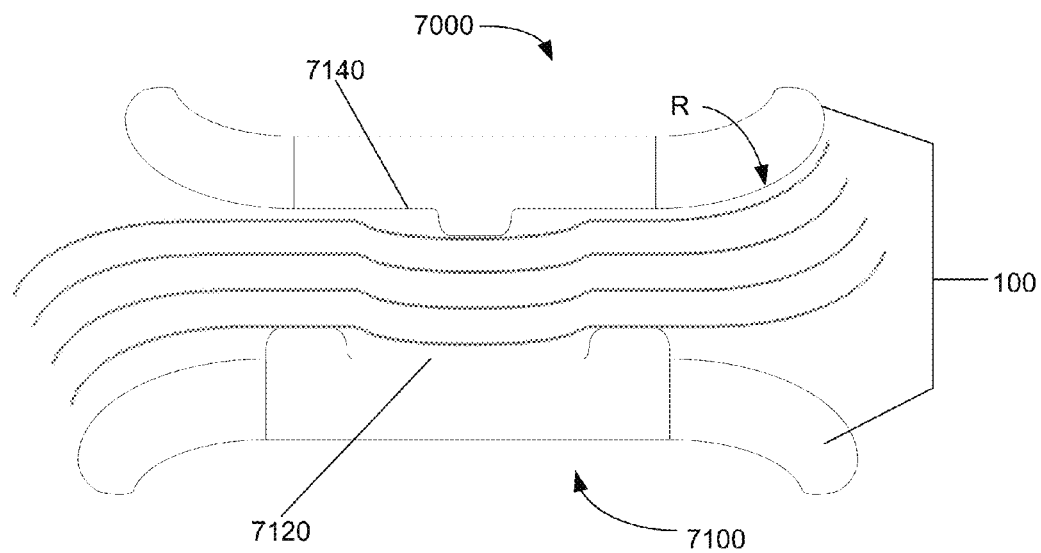
FIG. 17 is a magnified schematic illustration of a portion of a strain relief clamp in use according to an embodiment.

As described herein and shown in FIG. 17, the first surface 7120 and the second surface 7140 of the first attachment portion 7100 of the strain relief clamp 7000, excluding the respective protrusions of each, define a surface having a radius of curvature R no less than the minimum bend radius of the optical fiber ribbon. That is to say, the first attachment portion described herein can act as a guide for the optical fiber ribbon insuring it is not positioned or bent beyond its minimum bend radius.

The strain relief clamp described herein can be formed of any suitable material with desired properties (e.g. flexibility, ductility, moldablity, and/or the like). Furthermore, the apparatus can be made of more than one material. For example, a nylon base mold can be used with a rubber over mold to reduce hardness and increase friction at a desired location. The strain relief clamp can be faulted in any suitable fashion, for example, injection molding. Each of the components described herein can be monolithically constructed or can be a combination of parts. For example, in reference to FIG. 14, the second attachment portion 4200 can be secured to the first attachment portion using a screw or other mechanical fastener. In reference to FIG. 13, the second surface 3140 can be independently formed, where the tether 3135 is not present. Other aspects of the strain relief clamp shown and described can be modified to affect performance of the strain relief clamp. For example, the protrusions on the first and second surfaces can be formed of a soft gel like material with an adhesive backing, to better adhere to the first and/or second surfaces, thus controlling the location and the hardness of clamping.

Figure 18:
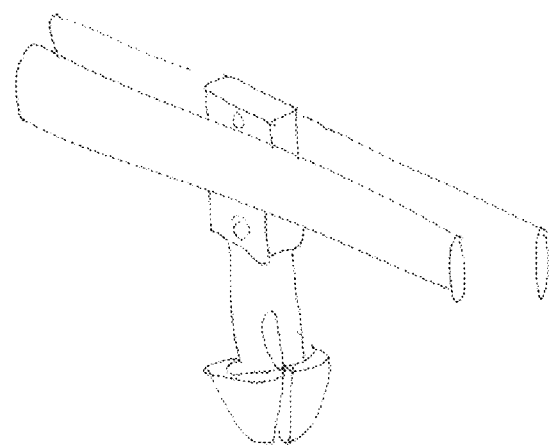
FIG. 18 is a schematic illustration of a portion of a strain relief clamp in use according to an embodiment.

While various embodiments have been described as having particular features and/or combinations of components, other embodiments are possible having a combination of any features and/or components from any of the embodiments as discussed above. For example, FIG. 18 is a schematic illustration of embodiment configured to clamp two sets of optical fiber ribbons, one on each side of the structure (the second fiber ribbon attachment portion not seen in FIG. 18). The attachment portions included in this embodiment each function as the strain relief clamp described in FIG. 15, including an additional attachment portion for a second set of optical fiber ribbons adjacent to the first attachment portion. While not seen in FIG. 18, the two attachment portions for clamping the fiber ribbon can each include a tether as described in FIG. 15.

While various embodiments have been described above, it should be understood that they have been presented by way of example only, and not limitation. Where methods and/or schematics described above indicate certain events occurring in certain order, the ordering of certain events may be modified. Additionally certain events may be performed concurrently in parallel processes when possible, as well as performed sequentially. For example, although some embodiments described above are discussed as being able to clamp one, two or three optical fiber ribbons, it should be understood the other strain relief clamp embodiments can clamp different numbers of optical fiber ribbons (e.g., one, two, three or four optical fiber ribbons; two, three, four or five optical fiber ribbons).

What is claimed is:

1. An apparatus, comprising: a strain relief clamp having a first attachment portion and a second attachment portion, the first attachment portion configured to couple the strain relief clamp to an optical ribbon, the second attachment portion configured to couple the strain relief clamp to an active optical component, the first attachment portion having a first surface and a second surface, the first surface of the first attachment portion defining a first protrusion and a second protrusion each having a longitudinal centerline substantially orthogonal to a longitudinal centerline of the optical ribbon when the optical ribbon is coupled to the strain relief clamp, the second surface of the first attachment portion defines a protrusion having a longitudinal centerline substantially orthogonal to the longitudinal centerline of the optical ribbon when the optical ribbon is coupled to the strain relief clamp.

2. The apparatus of claim 1, wherein:
the second attachment portion of the strain relief clamp configured to complementarily fit an attachment portion of the active optical component, the attachment portion of the active optical component configured to couple the active optical component to a device other than the strain relief clamp.

3. The apparatus of claim 1, wherein:
the second surface of the first attachment portion defines a protrusion having a longitudinal centerline substantially orthogonal to the longitudinal centerline of the optical ribbon when the optical ribbon is coupled to the strain relief clamp,
the first protrusion and the second protrusion of the first surface of the first attachment portion contacts a first portion of the optical ribbon and a second portion of the optical ribbon, respectively, when the optical ribbon is coupled to the strain relief clamp,
the protrusion of the second surface of the first attachment portion contacts a third portion of the optical ribbon when the optical ribbon is coupled to the strain relief clamp,
the third portion of the optical ribbon is between the first portion of the optical ribbon and the second portion of the optical ribbon when the optical ribbon is coupled to the strain relief clamp.

4. The apparatus of claim 1, wherein the first attachment portion has a live hinge disposed between the first surface and the second surface, the first surface and the second surface being coupleable such that a selectable distance between the first surface and the second surface is defined,
the selectable distance substantially corresponds to at least one of (1) a height of the optical ribbon, (2) the height of the optical ribbon and a height of a second optical ribbon, or (3) the height of the optical ribbon, the height of a second optical ribbon, and a height of a third optical ribbon.

5. The apparatus of claim 1, wherein:
the first attachment portion has a live hinge disposed between the first surface and the second surface, the optical ribbon disposed between the first surface and the second when the optical ribbon is coupled to the strain relief clamp,
the first attachment portion and the second attachment portion being monolithically formed.

6. The apparatus of claim 1, wherein:
the strain relief clamp encircling at least a portion of the active optical component and the optical ribbon being coupled to the active optical component within an interior of the strain relief clamp, when the strain relief clamp is coupled to the active optical component and when the optical ribbon is coupled to the active optical component.

7. The apparatus of claim 1, wherein:
the optical ribbon is a first optical ribbon, the active optical component being a first active optical component,
the first surface and the second surface of the first attachment being coupleable such that a selectable distance between the first surface and the second surface is defined, the selectable distance including a distance substantially corresponding to a height of the first optical ribbon and a height of a second optical ribbon,
when the first optical ribbon and the second optical ribbon are coupled to the strain relief clamp between the first surface and the surface, the first optical ribbon is extendable to the first active component and the second optical ribbon is extendible to a second active component substantially adjacent to the first active component.

8. An apparatus, comprising:
a strain relief clamp having an attachment portion configured to couple the strain relief clamp to an optical ribbon having a longitudinal centerline, the attachment portion having a first surface and a second surface,
the first surface of the attachment portion defining a first protrusion and a second protrusion each having a longitudinal centerline substantially orthogonal to the longitudinal centerline of the optical ribbon when the optical ribbon is coupled to the strain relief clamp, the second surface of the attachment portion defining a protrusion having a longitudinal centerline substantially orthogonal to the longitudinal centerline of the optical ribbon when the optical ribbon is coupled to the strain relief clamp.

9. The apparatus of claim 8, wherein:
the first protrusion and the second protrusion of the first surface of the attachment portion contacts a first portion of the optical ribbon and a second portion of the optical ribbon, respectively, when the optical ribbon is coupled to the strain relief clamp,
the protrusion of the second surface of the attachment portion contacts a third portion of the optical ribbon when the optical ribbon is coupled to the strain relief clamp,
the third portion of the optical ribbon is between the first portion of the optical ribbon and the second portion of the optical ribbon when the optical ribbon is coupled to the strain relief clamp.

10. The apparatus of claim 8, wherein:
the first surface of the attachment portion, excluding its first protrusion and its second protrusion, defining a surface having a radius of curvature no less than a minimum bend radius of the optical ribbon,
the second surface of the attachment portion, excluding its protrusion, defining a surface having a radius curvature no less than the minimum bend radius of the optical ribbon.

11. The apparatus of claim 8, wherein:
the first surface defines a first aperture and a second aperture, the second surface defines a first elongate portion having a plurality of elastically deformable extensions and a second elongate portion having a plurality of elastically deformable extensions,
the first elongate portion and the second elongate portion of the second surface configured to form a friction fit in the first aperture and the second aperture, respectively, of the first surface when the optical ribbon is coupled to the strain relief clamp between the first surface and the second surface.

12. The apparatus of claim 8, wherein:
the first surface defines a first aperture and a second aperture, the second surface defines a first elongate portion having a plurality of elastically deformable extensions and a second elongate portion having a plurality of elastically deformable extensions,
the first elongate portion and the second elongate portion of the second surface are configured to form a friction fit in the first aperture and the second aperture when the optical ribbon is coupled to the strain relief clamp between the first surface and the second surface such that a selectable distance between the first surface and the second surface is defined,
the selectable distance substantially corresponds to at least one of (1) a height of the optical ribbon, (2) the height of the optical ribbon and a height of a second optical ribbon, or (3) the height of the optical ribbon, the height of a second optical ribbon, and a height of a third optical ribbon.

13. The apparatus of claim 8, wherein
the first surface and the second surface moveably disposable to each other and coupled together by a tether having a first end coupled to an end portion of the first surface and a second end coupled to an end portion of the second portion.

14. The apparatus of claim 8, wherein
the first surface defines a first aperture and a second aperture, the second surface defines a first elongate portion having a plurality of elastically deformable extensions and a second elongate portion having a plurality of elastically deformable extensions,
the first surface and the second surface coupled together by a tether having a first end coupled to an end portion of the first surface and a second end coupled to an end portion of the second portion,
the first surface, the second surface and the tether being monolithically formed.

15. An apparatus, comprising:
a strain relief clamp having an attachment portion configured to couple an optical ribbon to the strain relief clamp, the attachment portion having a first surface and a second surface, the first surface defining a first aperture and a second aperture, the second surface defining a first elongate portion having a plurality of elastically deformable extensions and a second elongate portion having a plurality of elastically deformable extensions,
the first elongate portion and the second elongate portion of the second surface configured to form a friction fit in the first aperture and the second aperture, respectively, of the first surface when the optical ribbon is coupled to the strain relief clamp between the first surface and the second surface.

16. The apparatus of claim 15, wherein the first elongate portion and the second elongate portion of the second surface are configured to form a friction fit in the first aperture and the second aperture such that a selectable distance between the first surface and the second surface is defined.

17. The apparatus of claim 15, wherein:
the first elongate portion and the second elongate portion of the second surface are configured to form a friction fit in the first aperture and the second aperture such that a selectable distance between the first surface and the second surface is defined,
the selectable distance substantially corresponds to at least one of (1) a height of the optical ribbon, (2) the height of the optical ribbon and a height of a second optical ribbon, or (3) the height of the optical ribbon, the height of a second optical ribbon, and a height of a third optical ribbon.

18. The apparatus of claim 15, wherein:
the first surface of the attachment portion defining a first protrusion and a second protrusion each having a longitudinal centerline substantially orthogonal to the longitudinal centerline of the optical ribbon when the optical ribbon is coupled to the strain relief clamp, the second surface of the attachment portion defining a protrusion having a longitudinal centerline substantially orthogonal to the longitudinal centerline of the optical ribbon when the optical ribbon is coupled to the strain relief clamp.

19. The apparatus of claim 15, wherein:
the attachment portion is a first attachment portion, the optical ribbon is a first optical ribbon,
the strain relief clamp having a second attachment portion configured to couple a second optical ribbon to the strain relief clamp; the second attachment portion having a first surface and a second surface, the first surface of the second attachment portion defining a first aperture and a second aperture, the second surface of the second attachment portion defining a first elongate portion having a plurality of elastically deformable extensions and a second elongate portion having a plurality of elastically deformable extensions,
the first elongate portion and the second elongate portion of the second surface of the second attachment portion configured to form a friction fit in the first aperture and the second aperture, respectively, of the first surface of the second attachment portion when the second optical ribbon is coupled to the strain relief clamp between the first surface and the second surface of the second attachment portion.

* * * * *